(12) United States Patent
Etter

(10) Patent No.: US 7,527,665 B2
(45) Date of Patent: May 5, 2009

(54) REMOVABLE AIR FILTER SYSTEM FOR COMPRESSORS

(75) Inventor: Mark A. Etter, Independence, MO (US)

(73) Assignee: Black & Decker Inc., Newark, DE (US)

( * ) Notice: Subject to any disclaimer, the term of this patent is extended or adjusted under 35 U.S.C. 154(b) by 403 days.

(21) Appl. No.: 11/221,581

(22) Filed: Sep. 8, 2005

(65) Prior Publication Data
US 2006/0048489 A1 Mar. 9, 2006

Related U.S. Application Data

(60) Provisional application No. 60/607,931, filed on Sep. 8, 2004.

(51) Int. Cl.
*B01D 46/00* (2006.01)
(52) U.S. Cl. .............. 55/467; 55/495; 55/502
(58) Field of Classification Search ........... 55/320, 55/385.1, 472, 497, 502, 504, DIG. 17, 486, 55/521, 467, 469, 325, 332, 495
See application file for complete search history.

(56) References Cited

U.S. PATENT DOCUMENTS

| 4,022,550 | A |   | 5/1977 | Brink et al. |        |
|-----------|---|---|--------|--------------|--------|
| 4,693,735 | A | * | 9/1987 | Wehle ........................ | 55/385.1 |
| 5,368,621 | A |   | 11/1994 | Pool        |        |
| 5,735,918 | A | * | 4/1998 | Barradas ..................... | 96/222 |
| 5,759,217 | A | * | 6/1998 | Joy ............................. | 55/320 |
| 6,669,451 | B1 |  | 12/2003 | Wall        |        |
| 6,679,416 | B2 | * | 1/2004 | Lin ............................. | 228/57 |
| 6,955,697 | B1 | * | 10/2005 | Hsu et al. .................. | 55/385.1 |
| 7,195,463 | B1 |  | 3/2007 | Wall         |        |
| 2002/0104296 | A1 | * | 8/2002 | Cook et al. .................... | 55/319 |
| 2005/0072129 | A1 | * | 4/2005 | Daleiden ................... | 55/385.1 |

FOREIGN PATENT DOCUMENTS

| DE | 3806289 | 9/1989 |
| EP | 1222951 | 7/2002 |
| WO | 0170374 | 9/2001 |

* cited by examiner

*Primary Examiner*—Duane S Smith
*Assistant Examiner*—Minh-Chau T Pham
(74) *Attorney, Agent, or Firm*—Rhonda L. Barton; Michael P. Leary

(57) ABSTRACT

A compressor including a shroud for at least partially encompassing a component included in a compressor. A recess suitable for accepting at least two differently sized air filters having a similar geometric shaped is formed in the shroud. The compressor/filter system may utilize commonly available air filters which are designed for an unrelated device, but which are suitable for the purpose of filtering air for compressors. A fluid connection may extend between the enclosure forming the recess in the shroud and an inlet included in a compressor pump for pressuring air to a higher pressure. A securing mechanism, such as a panel door, may be implemented for securing an individual air filter in the path of air being drawn into the fluid connection for pressurization by the pump.

14 Claims, 3 Drawing Sheets

REMOVABLE AIR FILTER SYSTEM FOR COMPRESSORS

CROSS REFERENCE

The present application claims priority under 35 U.S.C. §119(e) to U.S. Provisional Patent Application Ser. No. 60/607,931, entitled: Removable Air Filter System for Compressors, filed on Sep. 8, 2004, which is hereby incorporated by reference in its entirety.

FIELD OF THE INVENTION

The present invention relates to the field of pneumatics and particularly to a compressor having an integrated removable air filter system.

BACKGROUND OF THE INVENTION

While air compressors are implemented in a wide variety of environments, typically these environments may tend to have dust and debris which may be drawn into the compressor and ultimately, be delivered to the tool in the pressurized air stream. The dust and debris may vary from sawdust particles in a woodshop to soil particles which are prevalent on a construction site or a garage for fixing vehicles. Dust and debris in a compressed air supply may foul tool components or be delivered with the air thereby, contaminating the project. For example, dust in a pneumatically operated nailer may cause jamming or increased wear on the tool. In another example, dust and debris provided in an air supply to a paint spray gun may deposit dust and debris on the workpiece thus, causing imperfections which may be noticeable upon visible inspection. Moreover, dust and debris in the air drawn into the compressor pump may increase friction thus, shortening the life expectancy of the compressor itself or increase the demand on the pump as material clogs the filter leading to the inlet for the pump.

Previous devices typically implement device specific filters, or proprietary filtering systems. As a result, manufacturers often have to produce multiple filters to ensure customer demands are met. For example, some previous filters include a cylindrical flange for connecting to an inlet tube on a compressor while other compressors employ alternatively configured filters utilizing flanges, screws and the like to retain the filter. While causing difficulties for manufacturers, retail outlets, such as home improvement centers, may not wish to offer numerous filters which consume valuable shelf space and are only sparingly sold. This difficulty may be exasperated when considering the wide variety of suppliers and models of devices offered by the typical home improvement center. Consumers who are faced with the prospect of having to locate a proprietary filter may become dissatisfied if, a replacement is not readily available. As a result, some users may merely attempt to blow out, or clean the filter, instead of utilizing a fresh replacement filer. Cleaning the filter may fail to remove all the trapped matter thus, leading to a shorter utilization interval before the filter may have to be replaced or cleaned out. In some instances, manufacturers may decide to implement simple filtering devices such as open cell foam type filters to allow for quick cleaning. These filters may not be robust in removing all types of material.

Therefore, it would be desirable to provide a compressor having a removable air filter system which is capable of implementing filters which are not specifically constructed for the compressor.

SUMMARY OF THE INVENTION

Accordingly, the present invention is directed to a compressor and to a system for providing a removable air filter for utilization in compressors. In aspects of the present invention, a compressor/filter system may utilize commonly available air filters which are designed for an unrelated device, but which are suitable for the purpose of filtering air for compressors.

In an aspect of the present invention, a compressor includes a shroud for at least partially encompassing a component included in a compressor. A recess suitable for accepting at least two differently sized air filters having a similar geometric shaped is formed in the shroud. A fluid connection may extend between the enclosure forming the recess in the shroud and an inlet included in a compressor pump for pressuring air to a higher pressure. A securing mechanism, such as a panel door, may be implemented for securing an individual air filter in the path of air being drawn into the fluid connection for pressurization by the pump. In a further aspect of the invention, a dedicated housing is constructed for containing at least two differently sized air filters.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
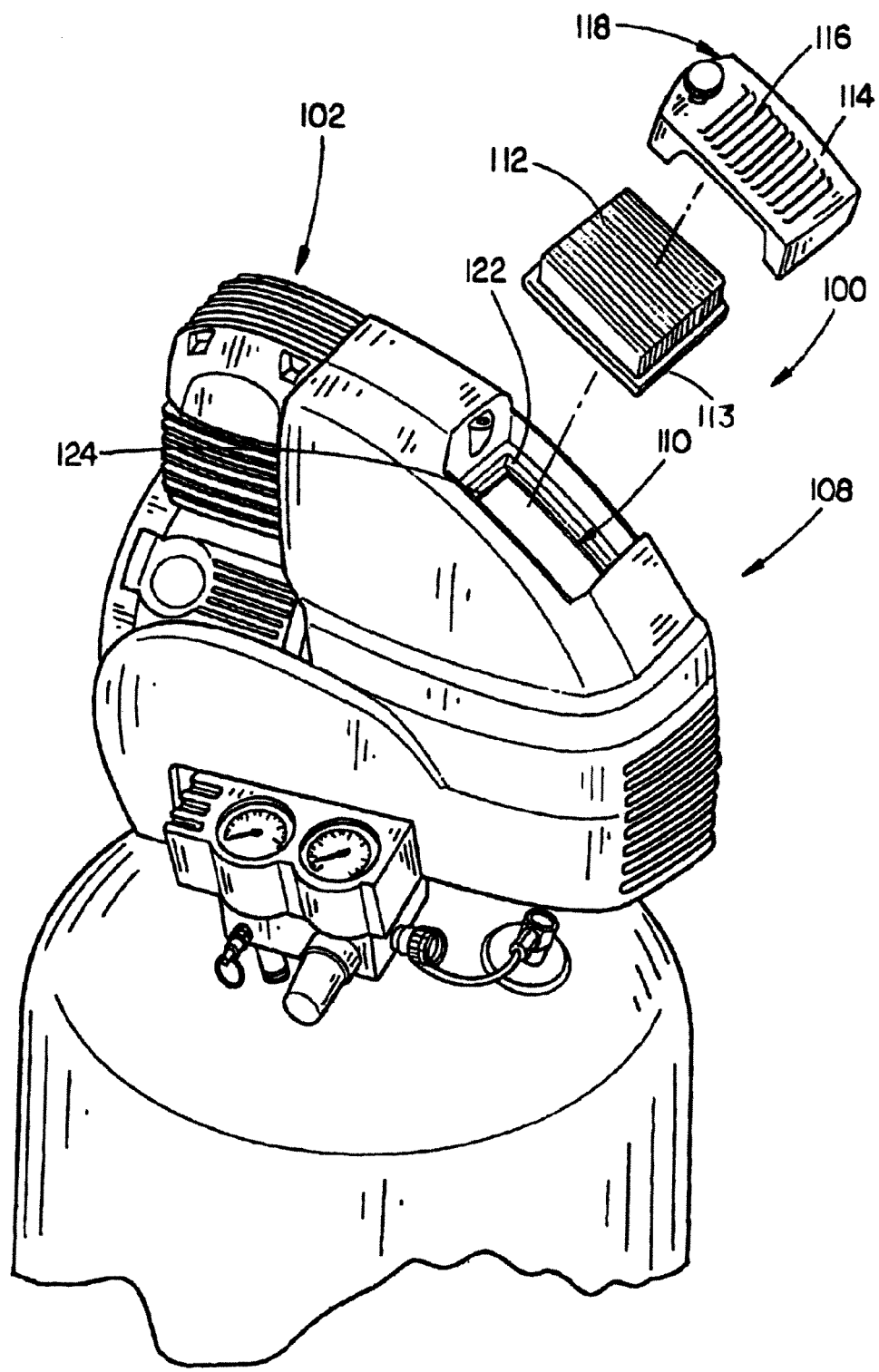
FIG. 1 is an isometric view of an air compressor in accordance with an aspect of the invention.

Reference will now be made in detail to the presently preferred embodiments of the invention, examples of which are illustrated in the accompanying drawings. While the present invention is described as implementing an electric motor for powering the pump, those of skill in the art will appreciate that the principles of the present invention are equally applicable to compressors which are operated by an internal combustion engine. Additionally, a wide variety of compressors such as vertical tank compressors, horizontal tank compressors, twin tank compressors, pancake compressors as well as, compressors not including tanks (tankless compressors), and the like for pressurizing air to a higher pressure, may implement the principles of the present invention.

As will also be appreciated by those of skill in the art, the present invention may make use of air filters which are not specifically designed or configured for utilization with the compressor of the present invention. For example, the compressor of the present invention may be capable of implementing a filter which is commercially available, rather than requiring a proprietary filter which is of a non-standard construction, e.g., having a flange for connecting to an air tube, or the like. In this manner, the user of a compressor, in accordance with the present aspect, may select an air filter which is sized and geometrically shaped to be received by the compressor, while the air filter is not specifically designed and manufactured for the compressor. Small combustion engine air filters may be of particular interest as small combustion engines are primarily manufactured and retailed in the United States of America by only a few companies, as a result air filtration systems for these device have become somewhat standardized for the industry. For example, engines manufactured by the American Honda Motor Corporation (Torrance, Calif.) and the Briggs and Stratton Corporation (Wauwatosa, Wis.) typically implement common filter schemes which are additionally available from third party vendors. Moreover, air filters of this class have generally appropriate characteristics such as size, filtering capacity, and filtering characteristics (i.e., for the range and size of debris expected to be found in a compressor environment).

For instance, most commercially available lawnmowers will implement a generally square paper air filter which includes a plastic or rubber gasket around the perimeter of one of the major sides. For example, most commonly utilized engines are in the range of approximately 3 hp to 10 hp (three horse power to ten horse power). These small combustion engines have air filters which correspond in size, shape, air filtering capacity, and the like to ensure proper operation of the corresponding engine. Moreover, the air filters for these types of engines are generally of appropriate size and filtering capacity for implementation in the present invention, while not specifically constructed for this purpose. Additionally, this type of air filter is commonly found in most home centers or stores in-which air compressors are retailed. Those of skill in the art will also appreciate that a compressor of the present invention may be configured to implement air filters having other geometries than specifically delineated herein without departing from the scope and spirit of the present invention. It is the intention of this disclosure to encompass and include such variation.

Figure 2:
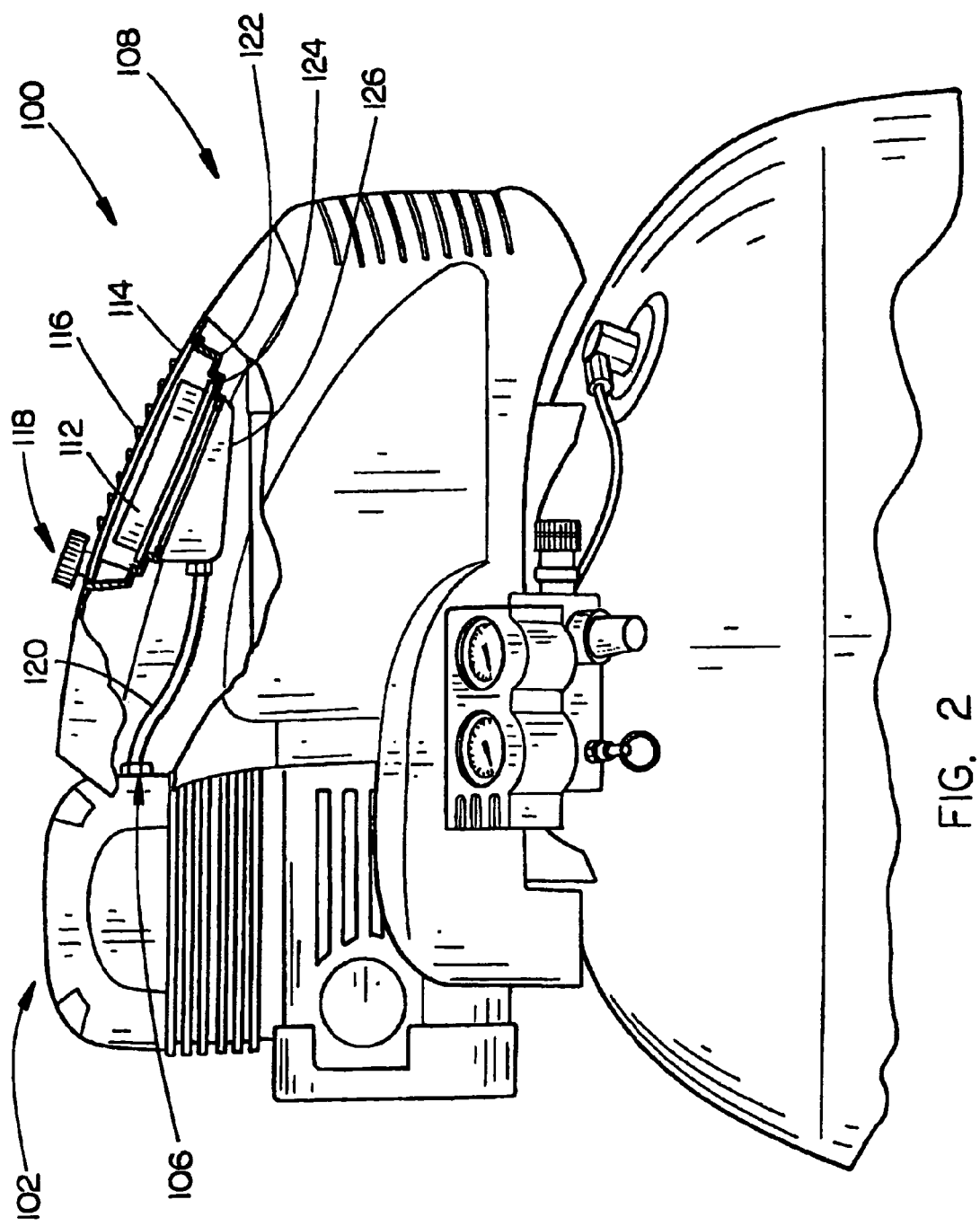
FIG. 2 is a partial side view of an air compressor in accordance with an aspect of the present invention.

Referring to FIGS. 1 and 2, a compressor 100 in accordance with an embodiment of the present invention is described. A pump 102 is included in the compressor 100 for pressurizing air from a first pressure to a second, higher pressure. An electric motor 104 is operatively coupled to the pump 102 for providing rotational force to drive the pump. In the present example, the pump 102 is a piston pump. Other suitable pumps include centrifugal, rotary, diffusion, and the like. While the compressor of the present embodiment is a direct drive (e.g., the motor drive shaft is utilized to rotate the pump eccentric) other transmission systems such as a belt drive may be implemented. The pump 102 includes an inlet port 106 for receiving air to be pressurized into the pump chamber. Those of skill in the art will appreciate a variety of different valves may be implemented to effectuate opening/closing of the inlet port during the pumping cycle. In the present embodiment, a shroud 108 is included in the compressor. The shroud 108 may be constructed for at least partially covering a compressor component such as a moving component or to prevent a user from contacting a heat generating component, or a component with an elevated temperature during utilization (while ensuring proper air flow to cool the component). In the present embodiment, the shroud is formed of plastic or polymeric material. In further embodiments, the shroud is formed of a composite material such as a polymer fiber material or the like for providing sufficient rigidity to the shroud, promoting efficient manufacture/formation, and the like. For example, the shroud 108 is configured to at least partially encompass the pump 102 so as to prevent a user from contacting the pump and/or the motor 104 for powering the pump.

In the present embodiment, the shroud 108 defines a recess 110 constructed to generally receive an air filter. Preferably, the recess extends inwardly from an exterior surface of the shroud. In other embodiments, the filter may be positioned vertically (with reference to FIG. 1) to increase airflow, reduce the likelihood of dust entering the filter recess compartment, and the like. Moreover, it may be preferable for the recess 110 to extend inwardly from the upper surface of the shroud, when orientated for use (as may be observed in FIG. 1), to allow for easy replacement, aid in seating the filter against an inner wall of the recess (when orientated with gravity), and the like. Those of skill in the art will appreciate that while the recess 110 is not constructed for a specific air filter, the recess may be shaped to receive a variety of air filters generally corresponding to a range and/or a size of air filters. In this fashion, the compressor 100 may accept an individual air filter within a class of air filters having dimensions less than that of the recess. This may allow for variation in the dimension of air filters by third party manufacturers without jeopardizing the opportunity to commercially obtain at least one acceptable air filter for utilization with the compressor. In the present example, the recess is generally rectilinear or generally rectangular in shape.

A tube 120, a hose, or other suitable connection for permitting fluid communication may extend between an inlet for the pump 102 and the recess 110 for permitting filtered air to flow to the compressor pump. In further examples, an airway channel is integrally formed in the shroud or the shroud directly connected to the pump inlet in order to allow air drawn through the filter to be directed to the pump inlet. The wall, or portion of the recess, having the fluid connection may be tapered to allow for sufficient air penetration through the filter 112. For example, the inner wall may slope inwardly towards the opening of the tube 120 to ensure airflow through the entirety of the filter 112. Referring to FIG. 2, a secondary void or a pan 126 formed adjacent the inlet to the tube 120 (disposed so environmental air is drawn through the filter 112) may allow air to be drawn through the entirety of the filter 112 in a similar manner as a tapered side. A taper area or a void zone may even eventual dust and debris blockage across the entirety of the filter. In the current embodiment, the interior wall, including the fluid connection between the recess and the pump includes multiple sealing surfaces of differing dimensions 122, 124 arranged in stepped formations to accommodate differently sized filters. Including multiple sealing surfaces 122, 124 for accepting differently sized filters may allow for a secure pneumatic fit of the filter gasket or seal 113 and reduce or eliminate airflow circumventing the filter 112 (e.g., dusty air going around the filter instead of through the filter).

A securing mechanism may be included in the compressor for securing the received filter against the wall portion including the tube opening. In the present embodiment, a panel door 114 is included for at least partially securing the filter 112 in place. A series of apertures, louvers 116, or the like may be included in the panel door to allow environmental air to enter the filter compartment. A lock may be included for fixing the panel door to secure the compartment and/or the filter 112. In the current example, a twist lock 118 having a knob is received in a corresponding aperture formed in the shroud. In alternative embodiments, snap fit tabs, screws, or the like are utilized to fix the panel door to the shroud. Preferably, a panel door is formed of plastic such as the same type of plastic which forms the shroud.

In further embodiments, a dedicated housing is constructed for receiving a filter. Additionally, the housing may serve ancillary purposes such as a mounting for a regulator, housing for electrical components for operating the motor (i.e., a pressure cut-off switch), and the like. The housing may be constructed with a recess substantially similar to the embodiments disclosed with reference to the shroud.

Figure 3:
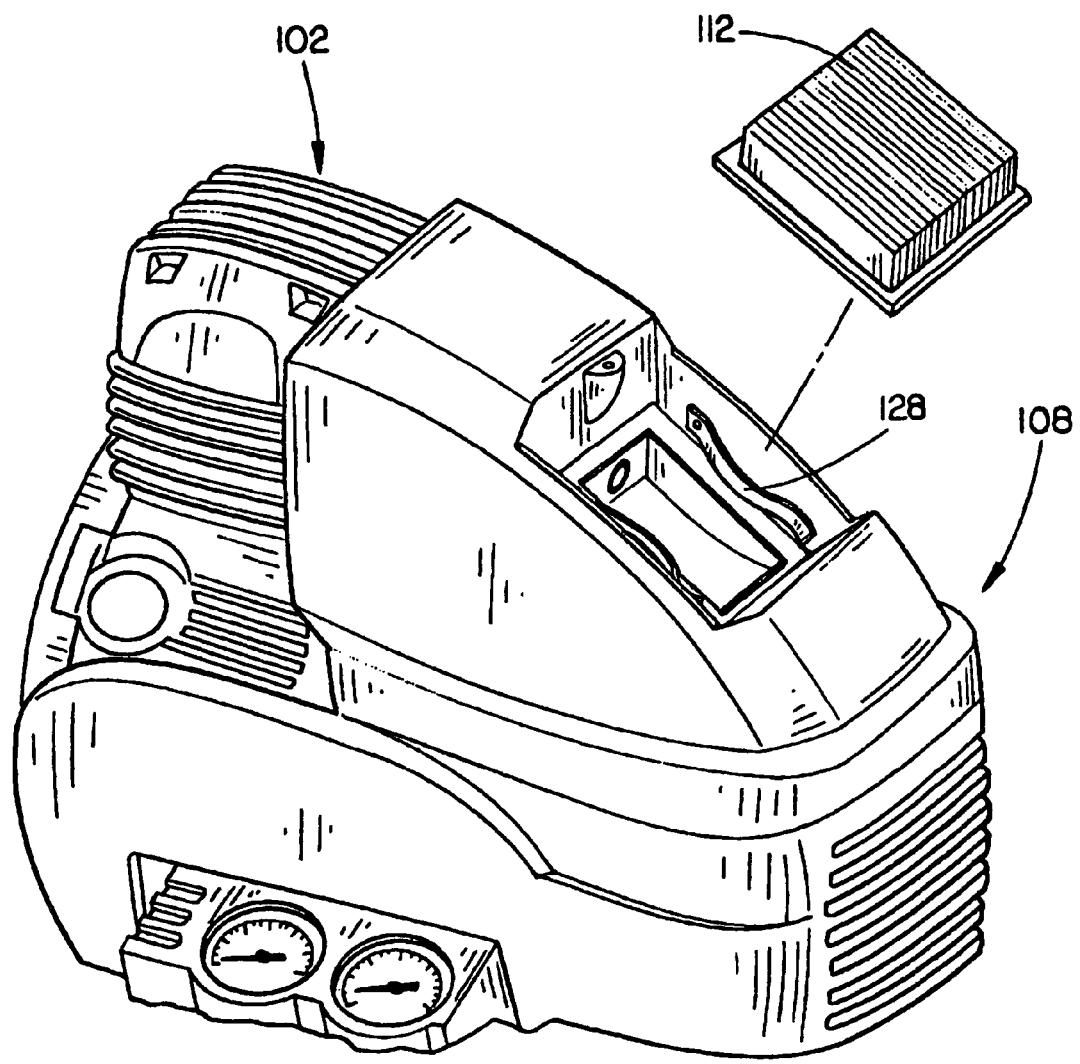
FIG. 3 is an isometric view of an air compressor in accordance with an aspect of the present invention, the compressor including a bent tab securing mechanism.

Referring briefly to FIG. 3, in further embodiments, a biased tab such as a bent tab 128, secured on a first end and a second end, or the like is implemented to secure an air filter in a desired position such that the filter is retained against the portion of the recess including the fluid connection with the pump. In the present example, two tabs are included on generally opposing sides of the recess. The biased tab may function generally as a leaf spring to accommodate differently sized filters, while aiding in position of the filter with respect to the fluid connection.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A compressor, comprising: a pump including an inlet for receiving air to be pressurized from a first pressure to a second, higher pressure; a housing defining an air filter recess, the housing including a fluid connection extending between a wall forming the recess and the pump inlet, the housing being additionally configured to couple with the compressor; and a securing mechanism for securing the received filter in engagement with the wall including the fluid connection with the pump inlet, wherein the air filter recess includes a first sealing surface arranged to mate with a first air filter having a first sealing geometry and a second sealing surface arranged to mate with a second air filter having a second sealing geometry, the first sealing geometry different from the second sealing geometry, and the air filter recess is configured to operatively hold only one of the first air filter and the second air filter at a given time.

2. The compressor of claim 1, wherein the securing mechanism is a louvered plastic door.

3. The compressor of claim 1, wherein the securing mechanism is a pair of generally opposing bent tabs.

4. The compressor of claim 1, wherein the housing and securing mechanism are capable of accepting an air filter designed for utilization in an internal combustion engine of between 3 hp to 10 hp (three horse power to ten horse power).

5. An air compressor comprising:
an air pump including an inlet for receiving air to be raised from a first pressure to a second pressure;
a filter housing upstream of the inlet for passing filtered air to the inlet, the filter housing including a first sealing surface arranged to mate with a first air filter having a first sealing geometry and a second sealing surface arranged to mate with a second air filter having a second sealing geometry, and the air filter housing is configured to operatively hold only one of the first air filter and the second air filter at a given time.

6. The air compressor of claim 5 wherein the first sealing surface defines a first area and the second sealing surface is located within the first area.

7. The air compressor of claim 5 wherein the first sealing surface and the second sealing surface are substantially concentric.

8. The air compressor of claim 6 wherein the first sealing surface and the second sealing surface are arranged step-wise within the filter housing.

9. The air compressor of claim 8 wherein the second sealing surface defines a second area and a pan is located below the second area and the pan is defines an outlet connected to an air duct which directs air from the filter housing to the air pump inlet.

10. The air compressor of claim 8 and further comprising a securing mechanism for holding one of the first air filter in contact with the first sealing surface and the second air filter in contact with the second sealing surface.

11. The air compressor of clam 10 wherein the securing mechanism is a pair of spring tabs.

12. The air compressor of claim 10 further including a shroud at least partially encompassing the air pump and the filter housing is located in the shroud.

13. The air compressor of claim 12 wherein the securing mechanism includes a door secured to the shroud and closing an inlet of the filter housing.

14. The air compressor of claim 13 wherein the door defines apertures for permitting air to enter the filter housing.

* * * * *